US006810484B2

(12) United States Patent
Govindaraman

(10) Patent No.: US 6,810,484 B2
(45) Date of Patent: Oct. 26, 2004

(54) DEVICE AND METHOD FOR CLOCK SYNCHRONIZATION THROUGH EXTRACTION OF DATA AT FREQUENCY DISTINCT FROM DATA RATE OF USB INTERFACE

(75) Inventor: Ravikumar Govindaraman, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 642 days.

(21) Appl. No.: 09/797,131

(22) Filed: Mar. 1, 2001

(65) Prior Publication Data

US 2002/0124200 A1 Sep. 5, 2002

(51) Int. Cl.[7] ................................................ H04L 7/00
(52) U.S. Cl. ......................................... 713/400; 710/61
(58) Field of Search ........................... 375/373; 341/68; 710/61; 713/400

(56) References Cited

U.S. PATENT DOCUMENTS 6,295,563 B1 * 9/2001 Whittaker ..................... 710/52

OTHER PUBLICATIONS

Intel Corporation, "USB 2.0 Transceiver Macrocell Interface (UTMI) Specification", Version 1.03, August 4, 2000.*

M. Nakamura et al, "A 156 Mbps CMOS Clock Rcovery Circuit for Burst–mode Transmission", Symposium on VLSI Circuits, Digest of Technical Papers, pp. 122–123, Jun. 1996.*

* cited by examiner

Primary Examiner—Thomas Lee
Assistant Examiner—Albert Wang
(74) Attorney, Agent, or Firm—Bever, Hoffman & Harms, LLP; Jeanette S. Harms

(57) ABSTRACT

The device and method that receives a signal from a first interface operating at a data rate. An extraction component extracts information from the signal to produce an information signal having a frequency distinct from the data rate of the first interface. A first receive clock component receives a first clock signal that has a frequency equal to a frequency of a second interface. A synchronizer component synchronizes the information signal through utilization of the first clock signal to the frequency of the second interface.

42 Claims, 3 Drawing Sheets

DEVICE AND METHOD FOR CLOCK SYNCHRONIZATION THROUGH EXTRACTION OF DATA AT FREQUENCY DISTINCT FROM DATA RATE OF USB INTERFACE

TECHNICAL FIELD

The invention relates generally to peripheral devices, and more particularly to Universal Serial Bus (USB) devices.

BACKGROUND OF THE INVENTION

A Universal Serial Bus (USB) compatible peripheral device (e.g., printer, scanner, digital camera, etc.) is attached to a USB host device, such as a personal computer, either directly through a USB interface or through a USB hub. During operation, the host device sends the peripheral device data or command signals. The peripheral device then sends response signals to the host device. For example, a scanner begins to transmit picture data to the host device, a printer outputs a print job or sends an off-line or out-of-paper signal to the host device.

The time that it takes for the host to receive the response signal is called "turnaround time". For the full speed operational mode, the USB protocol provides a maximum of turnaround time of 6.5 USB clock cycles to respond to the host device. If the peripheral device does not respond within the maximum turnaround time period, the host device ignores the peripheral device.

In conventional systems, a substantial component of transmission reception time is used to synchronize the signals from the clock domain of the data rate clock to the clock domain of the application (UTMI) and vice versa. Accordingly it is desirable to reduce the time needed for clock synchronization to maximize the time available for peripheral devices to perform their core function.

BRIEF DESCRIPTION OF THE DRAWINGS

These and other features and advantages of one embodiment of the invention will become apparent from the following detailed description, the accompanying drawings, and the claims.

DETAILED DESCRIPTION

In one example of the invention, a device and method are provided for clock synchronization through extraction of data at frequency distinct from the data rate of the USB interface.

In one example of the method, a signal from a first interface is received at a data rate. Information from the signal is extracted to produce an information signal having a frequency distinct from the data rate of the first interface. A first clock signal that has a frequency substantially equal to a frequency of a second interface is received. Finally, the information signal is synchronized through utilization of the first clock signal to the frequency of the second interface.

In another example of the method, a signal from a device controller is received over a second interface. A clock signal having a frequency application (UTMI) from a data rate of a frequency distinct interface is received. The signal is synchronized to the frequency distinct from the data rate of the second interface to produce a synchronized signal. The synchronized signal is transmitted to a host over the first interface.

In one example, the device includes a signal receive component that receives a signal from a first interface operating at a data rate. An extraction component extracts information from the signal to produce an information signal having a frequency distinct from the data rate of the first interface. A first receive clock component receives a first clock signal that has a frequency equal to a frequency of a second interface. A synchronizer component synchronizes the information signal through utilization of the first clock signal to the frequency of the second interface.

Another example of the device includes a receive signal component receives a signal sent from a device controller over a first interface. A clock receive component receives a clock signal having a frequency distinct from a data rate of a second interface. A synchronizer component synchronizes the signal to a frequency of the clock signal to produce a synchronized signal. A transmission component transmits the synchronized signal to a host over the second interface.

Another example of the method is a method for synchronizing a signal between clock domains of a USB macrocell device and a USB device controller that are coupled together through a Universal Transceiver Macrocell Interface (UTMI). In the method, a signal is received over a USB interface from a host at 12 Mbps. Information from the signal is extracted at a rate of 48 MHz to produce an information signal having a frequency of 48 MHz. The information signal is transmitted to a first synchronizer. A clock signal having a frequency of the UTMI is received at the first synchronizer. The information signal is synchronized to the frequency of the UTMI through utilization of the clock signal. The information signal is transmitted to the device controller through the UTMI.

Figure 1:
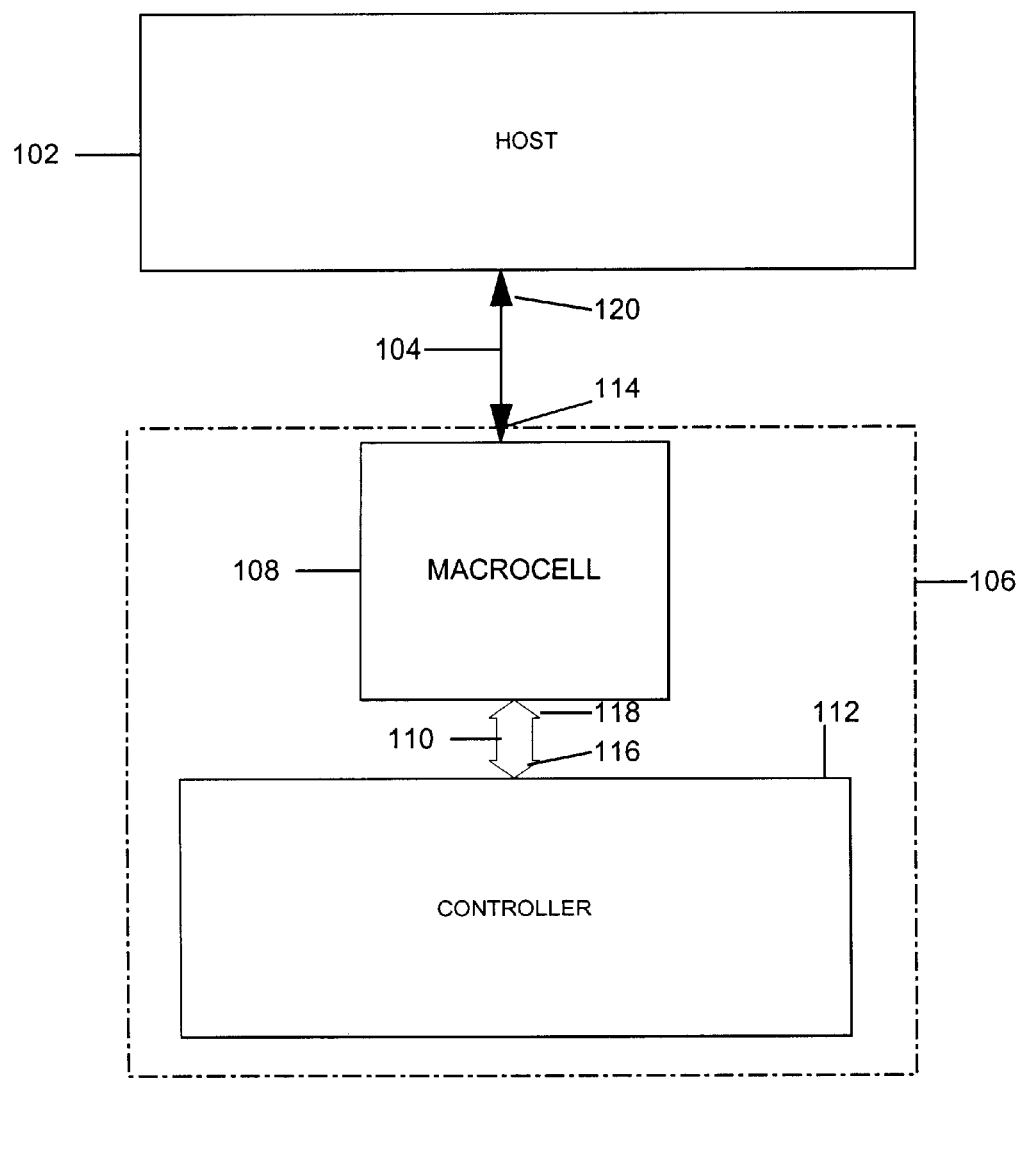
FIG. 1 is a functional block diagram of one example of a system comprising a peripheral device connected to a host device.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium, such as one or more of a magnetic, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions, stored in a computer-readable signal-bearing medium and written in or implemented with any of a number of programming languages, as will be appreciated by those skilled in the art.

System 100 in one example comprises a host device 102, an interface 104, and a peripheral device 106

Host device 102 in one example comprises a personal computer that is connectable to a USB interface. Host device 102 in another example comprises any computing device that is connectable to a USB compatible peripheral device through a USB interface. In a further example, host device 102 is connectable to a USB 2.0 interface.

Interface 104 comprises a bus that operates in accordance with the USB standard. Interface 104 may selectively comprise a bus that is USB 1.1 compliant, or a bus that is USB 2.0 compliant. In the USB 2.0 case, interface 104 has three operational modes with three signaling frequencies. The three operational modes comprise the low speed (ls) operational mode having a signaling frequency of 1.5 megabits per second (Mbps), the full speed (fs) operational mode having a 12 Mbps signaling frequency, and the high speed (hs) operational mode having a 480 Mbps signaling frequency.

Peripheral device 106 is connected to host device 102 through interface 104. Peripheral device 106 comprises a device that provides a peripheral function to a host device 102. Examples of such devices include, but are not limited to, printers, scanners, digital cameras, and the like. Peripheral device 104 may selectively be compatible with the USB 1.1 standard or the USB 2.0 standard.

Exemplary components of peripheral device 106 include macrocell 108, interface 110, and controller 112.

Macrocell 108 is a physical layer that connects controller 112 to interface 104. Macrocell 108 in one example supports the three signaling frequencies (i.e., 1.5 Mbps, 12 Mbps, 480 Mbps) of the operational modes discussed above. An example of macrocell 104 is the USB2 PHY manufactured by inSilicon Corporation of San Jose, Calif.

Interface 110 connects macrocell 108 to controller 112. Interface 110 in one example comprises a transceiver macrocell interface (UTMI). For instance, interface 110 may comprise a USB 2.0 UTMI. In the full speed and high speed operational modes, the UTMI is operable either as an 8-bit 60 MHz interface or as a 16 bit 30 MHz interface. In the low speed operational mode, the UTMI operates as either a 8-bit or 16 bit, 6 MHz interface. In the full speed only mode, the UTMI operates on either a 8 bit (or 16 bit 48 MHz interface).

Controller 112 controls peripheral device 106 in the execution of its core function, such as printing or scanning. Controller 112 also controls the transfer of data within peripheral device 106 and the transmission and reception of data to/from peripheral device 106.

Referring further to FIG. 1, system 100 operates such that host device 102 and peripheral device 106 exchange data and/or command signals over interface 104. In one example, host device 102 sends data to peripheral device 106. For example, a personal computer might send a print job to a printer. In another example, host device 102 sends commands or control signals to peripheral device 106. For instance, a personal computer might send a command to a scanner to begin a scan job.

Peripheral device 106 also sends signals to host device 102 over interface 104. For instance, a digital camera might send picture data to host device 102. In another example, peripheral device 106 sends commands or control signals to host device 102. For instance, a printer might send an off-line signal to host device 102. These examples are descriptive only and do not represent an exhaustive list of the transaction types that are possible between host device 102 and peripheral device 106, as would be understood by one of ordinary skill in the art.

A description of exemplary operation of system 100 is now provided.

Still referring to FIG. 1, host device 102 sends signals 114 over interface 104 to peripheral device 106. Signals 114 comprise command signals and/or data signals. In one example signals 114 are formatted as signal packets in accordance with the USB 1.1 or 2.0 protocols. Macrocell 108 receives signals 114 from host device 102 over interface 104. When interface 104 operates in high speed (hs) operational mode, macrocell 108 receives signals 114 at a serial data rate, or signaling frequency, of 480 Mbps. When interface 110 operates in full speed (fs) operational mode, macrocell 108 receives signals 114 at a signaling frequency of 12 Mbps. When interface 110 operates in low speed (ls) operational mode, macrocell 108 receives signals 114 at a signaling frequency of 1.5 Mbps.

After receiving signals 114, macrocell 108 performs functions, such as NRZI decoding, bit stuffing, deserialization, etc. on signals 114, as will be discussed with regard to FIG. 2. Macrocell 108 also synchronizes signals from the clock domain of host device 102 to the clock domain of controller 112. For example, signals 114 that are received from interface 104 are in a one clock domain, such as 12 MHz. Interface 110 and controller 112 operate at another clock domain. Before signals from one clock domain are sent to the other clock domain, the signals must be synchronized. After processing signals 114, macrocell sends signals 116 to controller 112.

After receipt of signals 116, controller 112 controls peripheral device 106 in the performance of its function, such as printing data or performing a scan job. Controller 112 can also respond to signals 116 by sending response signals 118 to host device 102. For example, if peripheral device 106 were a printer out of paper, signals 118 could comprise an out-of-paper message. In another example, if peripheral device 106 were a malfunctioning scanner, signals 118 could comprise a not-ready or malfunction signal. Signals 118 also comprise data, such as picture data from a scanner or digital camera.

Macrocell 108 receives response signals 118 and performs functions such as serialization, Not Return to Zero Inverted (NRZI) encoding, bit stuffing and the like on signals 118. Macrocell 108 also synchronizes signals 118 to the clock domain of host device 102. After processing signals 118, macrocell 108 sends signals 120 to host device 102.

Host device 102 receives signals 120. In one example host device 106 performs an operation in response to receipt of signals 120. Examples of possible operations include but are not limited to sending a reset signal, sending a chirp signal, transmitting additional data to peripheral device 106, storing data in an internal or external hard disk, and/or notifying a user, via an output device, of an error condition.

An exemplary description of one example of macrocell 108 is now provided.

Figure 2:
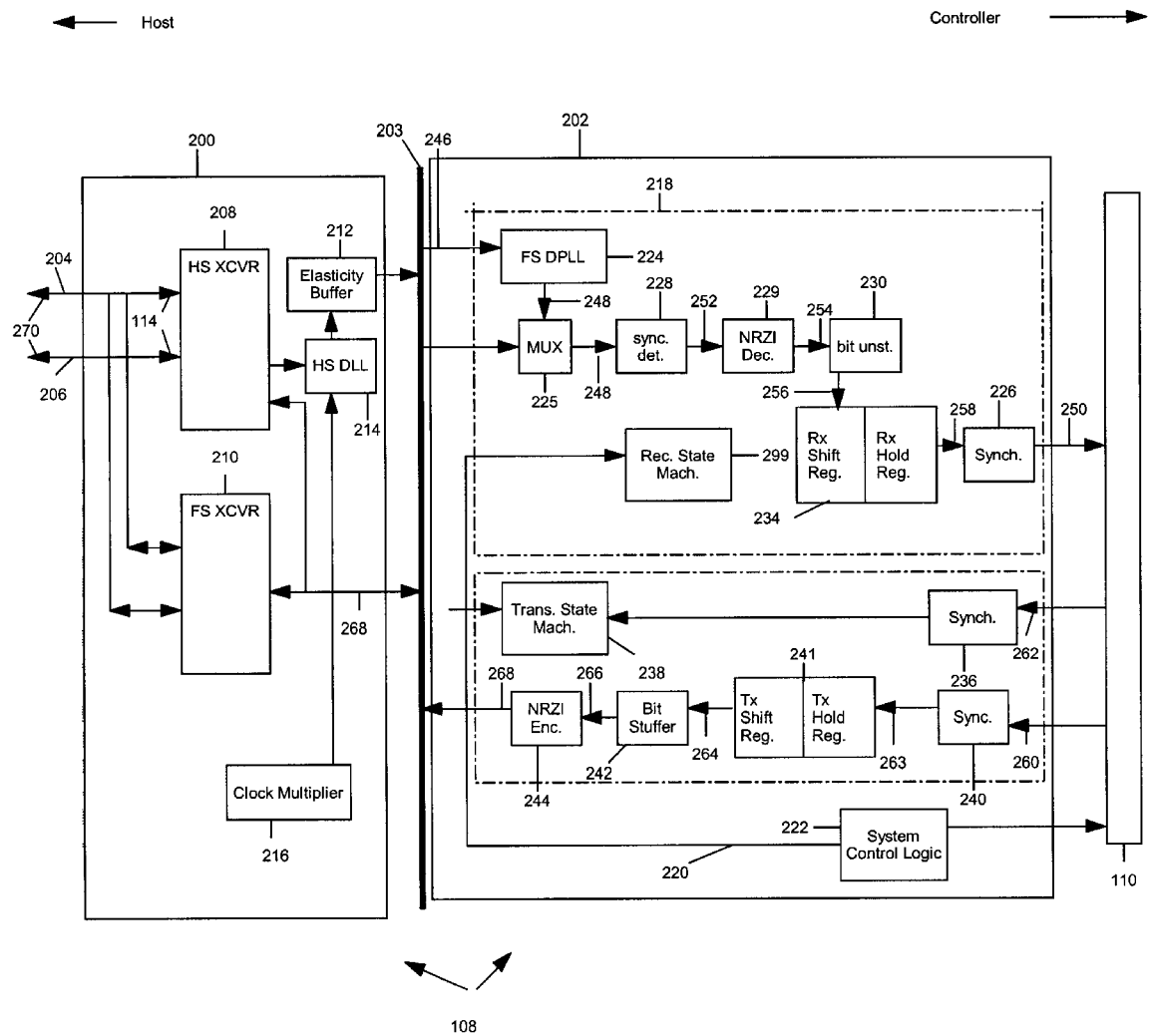
FIG. 2 is a functional block diagram of one example of the peripheral device of FIG. 1.

Turning to FIG. 2, in one example, macrocell 108 is a USB 2 PHY macrocell. Since the basic operation of the components in the macrocell 108 are known, conventional components and circuits have, for the most part, been illustrated in the drawings by readily understandable block representations and schematic diagrams, which show only those specific details that are pertinent to the present invention. These block representations and schematic diagrams and the structure and general operation or them will be readily apparent to those skilled in the art having the benefit of the description herein. Nevertheless, brief general descriptions of some of the components of macrocell 108 are now provided.

Macrocell 108 in one example comprises a mixed signal block 200 coupled to a digital block 202, through a mixed signal interface 203. The mixed signal block 202 is coupled to host 102 through a D+ line 204 and a D− line 206. Macrocell receives serial data signals from host device 102, as described above, through D+ line 204 and D− line 206.

Mixed signal block 200 comprises high speed transceiver 208, full speed transceiver 210, elasticity buffer 212, high speed delay lock loop (HS DLL) 214, and clock multiplier 216.

High speed transceiver 208 is responsible for the transmission and receipt of high speed (480 Mbps) signals to/from host device 102. Received data is sent from high speed transceiver 208 to high speed delay locked loop 214 and elasticity buffer 212.

Full speed transceiver 208 is responsible for the transmission and receipt of full speed (12 Mbps) and low speed (1.5 Mbps) data to/from host device 102. Full speed transceiver 210 sends low speed or full speed data to digital block for further processing.

Elasticity buffer 212 is the accumulation point for high-speed data before transfer to digital block. Full speed and low speed data do not pass through elasticity buffer.

High speed phase locked loop (HS DLL) 214 receives high speed data signals from high speed transceiver 208 and performs clock and data recovery on the signals. HS DLL 212 sends recovered clock and recovered data signals to the elasticity buffer 212.

Clock multiplier 216 generates the appropriate internal clock signals for the components of macrocell 108. In one example, clock multiplier 216 generates the internal clock signals from an external crystal (not shown).

It should be noted that the transmission and reception of signals in macrocell 108 are referred to in a host centric manner. Hence, signals that are received from host device 102 are referred to as received signals, and signals that are transmitted to host device 102 are referred to as transmitted signals.

Still referring to FIG. 2, digital block 202 in one example comprises a receive interface 218, a transmit interface 220, and control logic 222. Receive interface 218 receives signals, originating from host 102, from mixed signal block 200, over mixed signal interface 203. Receive interface 218 also transmits signals through interface 110 to controller 112. Transmit interface 220 receives signals from controller 112 over interface 110. Transmit interface 220 also transmits signals to mixed signal block 200 over mixed signal interface 203. Control logic 222 accepts control inputs from interface 110 and decodes the inputs to activate transmission and reception controls on mixed signal interface 203.

Receive interface 218 in one example comprises full speed digital phase locked loop (FS DPLL) 224, MUX 225, synchronizer 226, sync detector 228, NRZI decoder 229, bit unstuffer 230, receive shift/hold register 234, and receive state machine 236.

FS DPLL 224 operates as an extraction component to extract clock and data information from full speed and low speed signals that are received from mixed signal block 200. When macrocell 108 is in full speed operational mode, FS DPLL runs from a 48 MHz clock. When macrocell 108 is in low speed operational mode, FS DPLL runs from a 6 MHz clock. When macrocell 108 is in high speed operational mode, FS DPLL 224 does not receive signals sent from host device 102.

Mux 225 acts to allow signals to/from both high speed transceiver 208 and full speed transceiver 210 to be routed to receive interface 218. Hence, in high speed operational mode, signals are sent from high speed transceiver 208 through HS DLL 212, elasticity buffer 214, and mixed signal interface 203 to MUX 225. MUX 225 then routes the signals through the remaining components of receive interface 218 for further processing. Similarly, in the full speed or low speed operational modes, the full speed transceiver sends signals through mixed signal interface 203 to FS DPLL 224. FS DPLL 224 then sends signals to mux which routes the signals through the remaining components of receive interface 218 for further processing.

Sync detector 228 checks for a sync pattern in received signals. Upon detection of a sync pattern, sync detector 228 recognizes the start of a packet ID (PID) field in accordance with either the USB 1.1 or USB 2.0 protocols. The data in the received signal after the sync pattern is passed to the remaining blocks in receive interface 218.

NRZI decoder 229 decodes NRZI coded data from the received signals. NRZI decoder then sends signals to bit unstuffer 230.

Bit unstuffer 230 removes a stuffed "0" bit from received signals and detects bit stuff violations. In order to provide enough transitions for clock recovery, USB data is bit stuffed by inserting a "0" bit whenever a series of six consecutive data ones is encountered.

Receive shift/hold register 234 act as a serial-to-parallel conversion component to convert the serial signals received from host 102 to parallel signals. Receive shift/hold register can transmit either 8 or 16 bit parallel signals to a parallel receive port of interface 110.

Synchronizer 226 acts as a synchronizer component to synchronize signals that are received from host 102 to the clock domain of controller 112. In one example, synchronizer 226 synchronizes signals to a 30 MHz clock domain. In another example, synchronizer 226 synchronizes signals to a 60 MHz clock domain. In a further example, synchronizer 226 synchronizes signals to a 6 MHz clock domain. Synchronizer 226 could be comprised of one or more flip flops coupled together in series, as will be described herein.

Receive state machine 236 receives inputs from sync detector 228, mixed signal block 200, FS DPLL 224, and bit unstuffer 230. Receive state machine 236 generates signals for the parallel receive port of interface 110 to indicate the validity of parallel data.

Transmit interface 220 in one example comprises synchronizer 236, transmit state machine 238, synchronizer 240, transmit hold/shift register 241, bit stuffer 242, and NRZI encoder 244.

Figure 3:
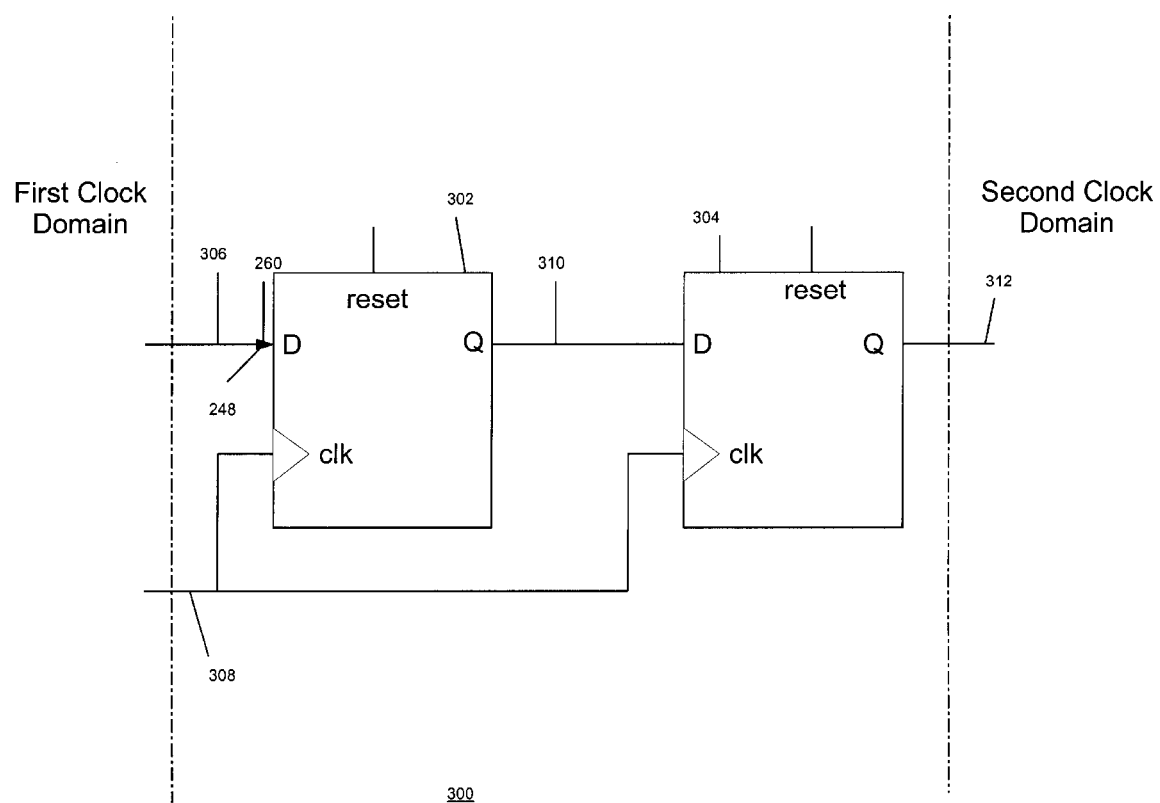
FIG. 3 is a functional block diagram of one example of a synchronizer that can be used in the peripheral device of FIG. 1.

Synchronizer 236 is employed as a synchronization component to synchronize tx_valid valid from interface 110. A description of one example of a synchronizer is shown in FIG. 3.

Transmit state machine 238 handles the handshake signals at the parallel transmit receive port of interface 110. The input of transmit state machine is a tx_valid signal from controller 112 that is synchronized by synchronizer 236 and it driven to transmit state machine 238 to send sync data for the packet to be transmitted.

Synchronizer 240 acts a synchronization component that synchronizes signals that are received from interface 110 to a frequency that is distinct from the data rate of interface 104. For example, in full speed operational mode, synchronizer synchronizes either a 30 MHz signal or a 60 MHz signal to a 48 MHz clock domain. In low speed operational mode, synchronizer receives a 6 MHz signal and synchronizes the signal to another 6 MHz signal. In high speed operational mode, the synchronizer receiver a 30 MHz or 60 MHz signal and synchronizes it to the 480 MHz clock domain.

Transmit hold/shift register 241 receives parallel data from synchronizer 240 and acts as a parallel-to-serial conversion component to convert signals received from interface 110 to parallel format. Transmit hold/shift register 241 can convert data from either 8-bit or 16-bit parallel data to a serial format.

Bit stuffer 242 inserts a data "0" after every six consecutive "1"s in the data stream. The inserted "0" forces a transition in the NRZI data stream. The transition is necessary for clock recovery. Bit stuffing is enabled with the sync pattern and is applied throughout transmission of signals from device controller 112 to host device 102.

NRZI encoder 244 encodes the serial signals that are to be transmitted to host device 102. NRZI encoding forces a level transition whenever a data "0" is input. A data "1" results in the previous level being maintained. NRZI encoder 244 transmits data to either high speed transceiver 208 or full speed transceiver 210 over mixed signal interface 203.

An exemplary description of the operation of macrocell 108 in full speed operational mode is now provided.

Referring still to FIG. 2, when, as was described above, host device 102 sends signals 114 to controller 112, macrocell 108 receives signals 114 from interface 104. In one example interface 104 is operating in full speed operational mode and therefore has a data rate of 12 Mbps. Alternatively, interface 104 could be operating in high speed operational mode or low speed operational mode. Mixed signal block 200 receives signals over D+ line 204 and D− line 206. In high speed operational mode, high speed transceiver 208 receives signals 208 and transmits signals 208 through HS DLL 214, elasticity buffer 212, and mixed signal interface 203, as described above, to receive interface 218 for further processing in accordance with the USB 2.0 protocol. In the full speed operational and low speed operational modes, full speed transceiver 210 receives the signal 114 and transmits signal 246 to FS DPLL 224 over mixed signal interface 203.

In the full speed operational mode or low speed operational modes, FS DPLL 224 extracts information from 246 signal to produce an information signal 248. In one example, information signal 248 has a frequency distinct from the frequency of interface 104. In one example, information signal 248 has a frequency of 48 MHz. In another example, information signal has a frequency of 6 MHz. FS DPLL 224 then transmits information signal 248 through MUX 225 to sync detector 228.

After sync detection, sync detector 228 transmits signal 252 to NRZI decoder 229. NRZI decoder 229 decodes signal 252 and transmits signal 254 to bit unstuffer 230. After bit unstuffing, but unstuffer 230 transmits signal 256 to receive shift/hold register 234.

Receive shift/hold register 234 converts signal 256 from a parallel format to a serial format. Receive shift hold register then transmits a parallel information signal 258 to synchronizer 226.

Synchronizer 226, in addition to receiving parallel information signal 258 also receives a clock signal that has the same frequency of interface 110 (e.g., 30 MHz, 60 MHz). Synchronizer 226 utilizes the clock signal to synchronize parallel information signal 258 to the frequency of interface 110. Synchronizer then transmits a synchronized information signal 250 to controller 112 over interface 110. In one example, signal 250 comprises an 8 bit 60 MHz parallel signal. In another example, signal 258 comprises 16-bit 30 MHz parallel signal. In a further example, signal 258 comprises 6 MHz 8-bit or 16-bit signals. In another example, signal 258 comprises 48 MHz 8-bit or 16-bit synchronized signals.

In one example after receiving signal 258, controller 112 sends a response signal 260 to host device 102. Controller 112 also asserts a tx_valid signal 262 to host device 102. Tx_valid signal 262 informs host device 102 that controller 112 has begun a transmission. Controller 112 negates tx_valid 262 when controller 112 is through with a transmission. Tx_valid is received by synchronizer 236. Synchronizer converts tx_valid signal 262 from the clock domain of interface 110 to the clock domain of interface 203.

Still referring to FIG. 2, synchronizer 240 receives response signal 260 from interface 110. In one example, signal 260 is a 30 MHz 16-bit parallel signal. In another example, signal 260 is a 60 MHz 8-bit parallel signal. In a further example, signal 260 is either 8-bit or 16-bit 6 MHz or 48 MHz data. Synchronizer 240 also receives a clock signal having a frequency distinct from the frequency of interface 110. In one example the clock signal has a frequency of interface 203. In one example (i.e., full speed operational mode), the clock signal has a frequency of 480 MHz. In another example, clock signal has a frequency of 12 MHz. In a further example, the clock signal has a frequency of 1.5 MHz. In another example (i.e., low speed operational mode), the clock signal has a frequency of 6 MHz. Synchronizer 240 synchronizes signal 260 to the frequency of the clock signal, thereby producing a synchronized response signal 263. In one example, synchronized response signal 263 has a frequency of 48 MHz. In another example, synchronized response signal 263 has a frequency of 6 MHz. In a further example, synchronized response signal 263 has a frequency of 480 MHz, 12 MHz, or 1.5 MHz. Synchronizer transmits signal 263 to transmit shift/hold register 241.

Transmit shift/hold register 241 converts the synchronized response signal 263 from parallel format (i.e., 8-bit or 16-bit) to serial format and transmits signal 264 to bit stuffer 242. In one example signal 264 is a serial synchronized response signal 264.

Bit stuffer 242 bit stuffs signal 264 and transmits signal 266 to NRZI encoder 244. Signal 266 in one example bit stuffed data. NRZI encoder 244 encodes signal 266 and sends signal 268 to mixed signal block 200.

Mixed signal block 200 receives signal 268 over interface 203 and sends signal 270 to host device 102 over D+ line 204 and D− line 206. In one example, full speed transceiver 210 sends signal 270 to host device 102. In another example, high speed transceiver 208 sends signals 270 to host device 102. Host device 102 in one example receives signal 270 over interface 104 at either the 1.5 Mbps, 12 Mbps, or 480 Mbps Referring to FIG. 3, an exemplary description of reduction in the time needed for clock synchronization is now provided.

FIG. 3 depicts an example of a logic diagram that can be used to represent an example of a synchronizer 300. Example synchronizer 300 is used to describe the operations of synchronizers 226, 236, and 240 in greater detail. This example synchronizer is used to demonstrate the reduction of clock synchronization time. It should be understood that other types of synchronizers could be used. The example synchronizer 300 comprises a first D flip-flop 302 and a second D flip-flop 304. Other types of synchronizers could also be used as synchronizer 300.

The first D flip flop 302 receives a signal 306 having a frequency of a first clock domain which is to be synchronized to a frequency of a second clock domain. The first D flip-flop 302 also receives a clock signal 308. Clock signal has the same frequency as the second clock domain. An output signal 310 of the first D flip flop 306 is used as an input of the second D flip-flop 304. The second D flip flop 304 also receives clock signal 308 as a clock input. Output signal 312 of second D flip-flop is synchronized to the second clock domain.

In operation, the D flip-flops 302, 304 output the value of their inputs only on the rising edge of clock signal 308. Accordingly, the time required to synchronize a signal from the first clock domain to the second clock domain is given by $$1*clk1 \text{ period}+2*clk2 \text{ period.} \quad (1)$$

The time required to synchronize a signal from the second clock domain to first clock domain is given by $$2*clk1 \text{ period}+1*clk2 \text{ period;} \quad (2)$$

where clk1 period is the period of the input signal 306 from the first clock domain and clk2 period is the period clock signal 308 of the second clock domain.

Accordingly, the total time required to synchronize a signal crossing from a first clock domain to a second clock domain and to synchronize a response signal from the second clock domain to the first clock domain is obtained by adding equation (1) to equation (3):

$$3*clk1 \text{ period}+3*clk2 \text{ period.} \quad (3)$$

Now referring again to FIG. 2, when macrocell 108 operates in full speed operational mode information signal 258 (48 MHz) is synchronized to the clock domain of interface 110. In addition signal 260 from the clock domain of interface 110 is synchronized to the clock domain of information signal 248. Clk1 period is therefore $1/48$ MHz and clk2 period is either 30 MHz or 60 MHz. Using the $1/48$ MHz for clk1 period and leaving clk2 period constant in equation (3) results in the total time needed for clock synchronization in macrocell 108 for a given transaction is =3*$1/48$ MHz+3*clk2 period =62.5 ns+3*clk2 period.

However, if the information in signal 246 were not extracted to produce an information signal distinct from the data rate of the interface 104, information signal 248 would have the same frequency as interface 114 (i.e., 12 MHz for full speed operational mode). Clk1 period would then equal $1/12$ MHz. Solving for equation (3) in this case results in a total synchronization time for a transaction of:

=3*$1/12$ MHz+3*clk2 period

=249.9 ns+3*clk2 period.

Consequently, by extracting the information in signal 246, before synchronization, to produce an information signal having a frequency distinct from the data rate of interface 104, macrocell reduces the total time needed for synchronization in a given transaction by 249.9 ns−62.5 ns=187.4 ns. Therefore, the total component of turnaround time related to clock synchronization for a given transaction in system 100 is reduced by 187.4 ns. This reduction in turnaround time provides the controller 112 with more time to process signals that it receives from host device 102.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising:
   receiving a signal from a first interface operating at a data rate;
   extracting information from the signal to produce an information signal having a frequency distinct from the data rate of the first interface;
   receiving a first clock signal that has a frequency of a frequency of a second interface; and
   synchronizing the information signal, through utilization of the first clock signal, to the frequency of the second interface.

2. The method of claim 1, wherein the step of extracting comprises the step of:
   extracting information from the signal at an extraction frequency distinct from the data rate of the first interface to produce the information signal.

3. The method of claim 2, wherein the step of extracting comprises:
   extracting information from the signal at an extraction frequency of 48 MHz.

4. The method of claim 1, wherein the step of receiving a signal comprises the step of:
   receiving the signal over a Universal Serial Bus (USB) interface.

5. The method of claim 4, wherein the step of receiving the signal over a USB interface comprises:
   receiving the signal at a data rate of 12 Mbps.

6. The method of claim 1, further comprising the steps of:
   converting a synchronized information signal from a serial format to a parallel format to produce a parallel synchronized information signal, and
   transmitting the parallel synchronized information signal to a device controller over a Universal Transceiver Macrocell Interface (UTMI).

7. The method of claim 6, wherein the step of transmitting the parallel synchronized information signal comprises the step of:
   transmitting the parallel synchronized information signal at a frequency of 30 MHz.

8. The method of claim 7, wherein the step of converting comprises the step of:
   converting the synchronized information signal to a 16 bit parallel format.

9. The method of claim 6, wherein the step of transmitting the parallel synchronized information signal comprises the step of:
   transmitting the parallel synchronized information signal at a frequency of 60 MHz.

10. The method of claim 9, wherein the step of converting comprises the step of:
    converting the synchronized information signal to a 8 bit parallel format.

11. The method of claim 6, further comprising the steps of:
    receiving a response signal from the device controller over the UTMI,
    receiving a second clock signal that is the frequency of the information signal, and
    synchronizing the response signal to the second clock signal through utilization of the clock signal to produce a synchronized response signal.

12. The method of claim 11, wherein the step of receiving a response signal comprises the step of:

receiving one of a 30 MHz 16-bit parallel response signal and a 60 MHz 8-bit parallel response signal over the UTMI.

13. The method of claim 11, further comprising the steps of:
converting the synchronized response signal from a parallel format to a serial format to produce a serial synchronized response signal, and
transmitting the synchronized serial response signal to the host device over the first interface.

14. The method of claim 13, wherein the transmitting the synchronized serial response signal step comprises the step of:
transmitting the synchronized serial response signal over a USB interface at a data rate of 12 MHz.

15. A method, comprising the steps of:
receiving a signal from a device controller over a first interface;
receiving a clock signal having a frequency distinct from a data rate of a second interface;
synchronizing the signal to the frequency distinct from the data rate of the second interface to produce a synchronized signal; and
transmitting the synchronized signal to a host over the second interface.

16. The method of claim 15, wherein the step of receiving the signal comprises:
receiving one of a 16-bit 30 MHz signal and a 8-bit 60 MHz signal over a Universal Transceiver Macrocell Interface (UTMI).

17. The method of claim 15, wherein the step of receiving a clock signal comprises the step of:
receiving a 48 MHz clock signal.

18. The method of claim 15, wherein the step of transmitting comprises the step of:
transmitting the synchronized signal to the host over a Universal Serial Bus (USB) interface having a data rate of 12 MHz.

19. A device comprising:
a signal receive component that receives a signal from a first interface operating at a data rate;
an extraction component that extracts information from the signal to produce an information signal having a frequency distinct from the data rate of the first interface;
a first receive clock component that receives a first clock signal that has a frequency equal to a frequency of a second interface; and
a synchronizer component that synchronizes the information signal, through utilization of the first clock signal, to the frequency of the second interface.

20. The device of claim 19, wherein the extraction component extracts information from the signal at an extraction frequency distinct from a data rate of the first interface to produce the information signal.

21. The device of claim 20, wherein the extraction component extracts information from the signal at an extraction frequency of 48 MHz.

22. The device of claim 19, wherein the first interface is an Universal Serial Bus (USB) interface.

23. The device of claim 22, wherein the data rate is 12 Mbps.

24. The device of claim 19, further comprising:
a serial-to-parallel conversion component that converts a synchronized information signal from a serial format to a parallel format to produce a parallel synchronized information signal, and
a transmission component that transmits the parallel synchronized information signal to a device controller over a Universal Transceiver Macrocell Interface (UTMI).

25. The device of claim 24, wherein the transmission component transmits the parallel synchronized information signal to the device controller at a frequency of 30 MHz.

26. The device of claim 25, wherein the serial-to-parallel conversion component converts the synchronized information signal to a 16-bit parallel format.

27. The device of claim 24, wherein the transmission component transmits the parallel synchronized information signal to the device controller at a frequency of 60 MHz.

28. The device of claim 27, wherein the serial-to-parallel conversion component converts the synchronized information signal to a 8-bit parallel format.

29. The device of claim 24, further comprising:
a response signal receive component that receives a response signal from the device controller over the UTMI,
a second receive clock component that receives a second clock signal equal to the frequency of the information signal, and
a response synchronization component that synchronizes the response signal to the frequency of the information signal through employment of the second clock signal to produce a synchronized response signal.

30. The device of claim 29, wherein the response signal receive component receives one of a 30 MHz 16-bit response signal and a 60 MHz 8-bit response signal.

31. The device of claim 29, further comprising:
a parallel-to-serial conversion component that converts the synchronized response signal to a serial format from a parallel format to produce a serial synchronized response signal, and
a response transmission component that transmits the serial synchronized response signal to the host device over the first interface.

32. The device of claim 31, wherein the response transmission component transmits the serial synchronized response signal over a USB interface having a data rate of 12 Mbps.

33. A device, comprising:
a receive signal component that receives a signal sent from a device controller over a first interface;
a clock receive component that receives a clock signal having a frequency distinct from a data rate of a second interface;
a synchronizer component that synchronizes the signal to the frequency of the clock signal to produces a synchronized signal; and
a transmission component that transmits the synchronized signal to a host over the second interface.

34. The device of claim 33, wherein the receive signal component receives one of a 16-bit 30 MHz signal and a 8-bit 60 MHz signal over a Universal Transceiver Macrocell Interface (UTMI).

35. The device of claim 33, wherein the clock receive component receives a 48-MHz clock signal.

36. The device of claim 33, wherein the transmission component transmits the synchronized signal to the host over a Universal Serial Bus (USB) interface operating at 12 Mbps.

37. A method for synchronizing a signal between clock domains of a USB macrocell device and a USB device controller that are coupled together through a Universal Transceiver Macrocell Interface (UTMI), comprising:

receiving a signal over a USB interface from a host at 12 Mbps;

extracting information from the signal at a rate of 48 MHz to produce a information signal having a frequency of 48 MHz;

transmitting the information signal to a first synchronizer receiving a clock signal, at the first synchronizer, having a frequency of the UTMI;

synchronizing the information signal to the frequency of the UTMI through utilization of the clock signal;

transmitting the information signal to the USB device controller through the UTMI.

38. The method of claim 37, wherein the step of receiving a clock signal comprises receiving a 30 MHz clock signal.

39. The method of claim 37, wherein the step of receiving a clock signal comprises receiving a 60 MHz clock signal.

40. The method of claim 37, further comprising:

receiving a response signal, from the USB device controller, having a frequency of the UTMI, transmitting the response signal to a second synchronizer, receiving a 48 MHz clock signal at the second synchronizer, synchronizing the response signal to 48 MHz to produce a synchronized response signal, and transmitting the synchronized response signal to the USB host over the USB interface.

41. The method of claim 40, wherein the step of receiving the response signal comprises the step of:

receiving a 30 MHz response signal.

42. The method of claim 40, wherein the step of receiving the response signal comprises the step of:

receiving a 60 MHz response signal.

\* \* \* \* \*